(12) United States Patent  
Rosaen (10) Patent No.: US 7,530,728 B2
(45) Date of Patent: May 12, 2009

(54) WATER CONTROL APPARATUS (76) Inventor: Lars Rosaen, 46980 N. Territorial Rd., Plymouth, MI (US) 48170

( * ) Notice: Subject to any disclaimer, the term of this patent is extended or adjusted under 35 U.S.C. 154(b) by 0 days.

(21) Appl. No.: 11/876,491

(22) Filed: Oct. 22, 2007

(65) Prior Publication Data
US 2008/0092957 A1   Apr. 24, 2008

Related U.S. Application Data (60) Provisional application No. 60/862,672, filed on Oct. 24, 2006.

(51) Int. Cl.
B28C 5/18 (2006.01)
(52) U.S. Cl. .......................... 366/17; 366/40
(58) Field of Classification Search ............ 366/17, 366/3, 10, 30, 40; 137/101.19
See application file for complete search history.

(56) References Cited

U.S. PATENT DOCUMENTS

| 3,135,493 | A | 6/1964 | Gizeski |
| 3,474,829 | A | 10/1969 | Scheineman |
| 3,877,715 | A | 4/1975 | Thayer et al. |
| 4,842,005 | A | 6/1989 | Hope et al. |
| 5,624,182 | A | 4/1997 | Dearing, Sr. et al. |
| 5,713,663 | A * | 2/1998 | Zandberg et al. ............. 366/8 |
| 5,752,768 | A | 5/1998 | Assh et al. |
| 5,775,803 | A | 7/1998 | Montgomery et al. |
| 5,908,240 | A | 6/1999 | Hood et al. |
| 6,484,079 | B2 * | 11/2002 | Buckelew et al. ............. 366/1 |
| 6,611,755 | B1 | 8/2003 | Coffee et al. |
| 6,966,687 | B1 | 11/2005 | Elefsrud |
| 2003/0202418 | A1 | 10/2003 | Scartezina |
| 2007/0064518 | A1 | 3/2007 | Goff et al. |

* cited by examiner

Primary Examiner—Tony G Soohoo
(74) Attorney, Agent, or Firm—Gifford, Krass, Sprinkle, Anderson & Citkowski, P.C.

(57) ABSTRACT

An embodiment of a water control apparatus is disclosed that may be used with a concrete mixing assembly. The apparatus may include flowmeter unit and a normally closed valve unit. The normally closed valve unit may be in fluid communication with, and removably connected to, the flowmeter unit. A control unit may be provide that may monitor the flowmeter unit and electronically control the opening and close of the normally closed valve unit. A switch may be also provided that may electrically communicate with the control unit. The activation of the switch being operable to cause the normally closed valve to open and result in the flow of water into a concrete mixing drum that is in fluid communication with the normally closed valve.

14 Claims, 7 Drawing Sheets

WATER CONTROL APPARATUS

REFERENCE TO RELATED APPLICATIONS

The present application claims priority from U.S. Provisional Application No. 60/862,672, which was filed on Oct. 24, 2006, the disclosure of which is incorporated by reference.

FIELD OF THE INVENTION

Described herein is an embodiment of a water control apparatus that may be used in connection with a commercial mixing assembly or vehicle (e.g., a concrete mixer truck). More specifically, described herein is a water control assembly that may, alone or in combination with a concrete mixer vehicle or assembly, operate to monitor water volume usage vehicle/assembly operator use, manually or automatically control the addition of water to a mix, and/or transmit status data to a remote location.

REFERENCE TO RELATED ART

Concrete mixer trucks typically have two water flows that are of concern to the operator. One flow is the adding of water to the concrete batch. The second flow is the washing of the truck chute after the concrete has been dispensed. Issues related to these duel concerns have been found to manifest in a number of ways.

By way of example only, the ready-mix concrete used in construction applications m,ay typically be prepared at a batch plant and then transported by truck in a rotating drum to a job site. As the truck travels to a job site, the curing process for the concrete is underway. Therefore, it may be necessary for the driver (during travel or when at the job site) to add extra water to the batch so that the concrete maintains sufficient fluidity for pouring. However, this extra water may reduce the strength of the resulting concrete, or (if too much water is added) even ruin the load.

Accordingly, it would be advantageous to have a system that may accurately measure/control the amount of water being added to a mix (i.e., the slump) to ensure that the mix is within (or says within) a predetermined water-cement ratio (WCM).

By way of another example, when preparing a concrete batch, it is know that modern mixing vehicles may use a manually operable valve arrangement that permits the operator to fill the mixing drum with the slump. These manual valve arrangements may include flowmeters that indicate the amount of water being added to the mix. However, as mentioned above, these same mixing vehicles may also include a manually operable assembly that permits the vehicle operator to add water to the slump while in route. Specifically, the vehicles may include a lever (or the like) in the vehicle cab that allows the operator to add water to the mix from a pressurized tank of water mounted on each vehicle. The water being added in route may go through a flowmeter. However, when the flowmeter is positioned outside the vehicle cabin the operator has no way of knowing exactly how much water has been added. Further, currently available systems may also allow the operator to manually "crack" the valve open just enough to allow water to flow into the mix, but at a pressure or flow rate that is to low to be detected by the flowmeter (e.g., less than about 5 gallons per minute). Therefore, it may be possible for the operator to add water to the slump in a manner that is not detected by the flowmeter. In addition, over time the flowmeter itself may be subject to a variety of harsh conditions (e.g., acid wash, icing on cables, leaking connector, meter hanging up due to entrained dirt, and compressed air over ranging) that may damage or even destroy the meter.

Accordingly, it would be advantageous to have a water control system that allows better control and monitoring of the addition of water to the mix during all stages of production and delivery. It would also be advantageous to have a system whereby the stages of a mixing job could be tracked and reported to a remote location, such as a central tracking station. Indeed, such a system would address a long felt need in the industry for a reliable means of monitoring and controlling water use on mixer vehicles and assemblies.

SUMMARY OF THE INVENTION

The water control apparatus disclosed herein overcomes the issues raised by the prior art. The apparatus includes a flowmeter that may monitor the amount of water added to a mixer drum when a solenoid valve is actuated to allow flow into the drum. The flowmeter may be a non-mechanical flowmeter. Therefore, dirt, external corrosives, and compressed air do not affect the flowmeter's operation. The flowmeter is also accurate to 1%, thereby meeting the requirements of the U.S. Department of Transportation Federal Highway Administration FP-03 552.05. The solenoid valve may be actuated by a button in the truck cab, which replaces the manual valve usually located next to the driver. The solenoid valve is either fully on or fully off. Therefore, the ability for an operator to manually "crack" open a valve so that the flow is below a rate where it can be sensed by a flowmeter is eliminated. The amount of water being added may also be recorded by a control unit and transmitted to a remote location for record keeping.

More specifically, a water control apparatus that may be used with a commercial mixing vehicle may include a flowmeter unit in fluid Communication with a water source, an (optional) normally open valve unit, and a normally closed valve unit. The normally open valve unit may be removably connected to the flowmeter unit. The normally closed valve unit may likewise be removably connected to the normally open valve unit. Alternatively, the normally closed valve unit may be removably connected to the flowmeter unit, or to a conduit (not shown) positioned between the flowmeter unit and the normally closed valve unit. The valve units may each include a power-actuated valve that may he triggered in response to commands from a control unit. The control unit may be activated by a switching device positioned in the vehicle cabin.

In operation, for example with a mixer truck, the normally open value unit may have a hose (or the like) and spray nozzle attached to permit a user to wash out tie truck and mixing equipment. A second hose or conduit may be connected at one end to the normally closed value unit and terminate at an opposite end in the mixer drum of the truck. Water may, therefore. The communicated from a source (e.g., a fixed water tank, truck mounted drum, etc.) to the flowmeter unit where the rate and/or volume of the water passing through the unit may be measured. Such measurements may be indicated on a display associated with the switching device. Water passing though the flowmeter unit may next pass through the normally open valve unit, and then on to the normally closed value unit.

Activation of the switching device by a user may result in the control unit causing the valve of the normally open valve unit to close, and the valve of the normally closed valve unit to open. Alternatively, the valves may he automatically actuated as Just described by the control unit using on board software and/or hardware programmed to cause water to be added at predetermined times or following predetermined events. Opening of the valve of the normally closed valve unit may thus cause an amount of water to be easily communicated from a water source and into the mixer drum of the mixer truck.

As a still further alternative, it will be appreciated that the control unit may be programmed to prevent the opening of the valve of the normally closed valve unit where the addition of water would cause the mix to exceed a predetermined water-cement ratio.

It will also be appreciated that a user of the water control apparatus would be prevented from manually "cracking" a valve open to add water to the mix. Indeed, since the power-actuated valves of the valve units are always either full open, or full closed. The flow rate of water through the flowmeter unit is maximized and the resulting accuracy of the water rate/volume measurement is increased.

BRIEF DESCRIPTION OF THE DRAWINGS

Reference will now be made to the attached figures wherein like reference numerals refer to like parts throughout and wherein.

DETAILED DESCRIPTION OF THE INVENTION

Referring now to FIGS. 1 through 7, a water control apparatus 10, which may be used with a commercial mixing vehicle 100 having a mixer drum 102, may include a flowmeter unit 12 in fluid communication with a water source 104, an (optional) normally open valve unit 14, and a normally closed valve unit 16. The normally open valve unit 14 may be removably connected to the flowmeter unit 12. The normally closed valve unit 16 may likewise be removably connected to the normally open valve unit 14. Alternatively, the normally closed valve 16 unit may be removably connected to the flowmeter unit 12, or to a conduit (not shown) positioned between the flowmeter unit 12 and the normally closed valve unit 16. The valve units 14, 16 may each include a power-actuated valve 18, 20. Specifically, valves 16, 18 may each be a solenoid 19, 21 controlled valve. Further, each valve 18, 20 may be actuated in response to a command(s) from a control unit 22 that may be activated by a remotely positioned switching device 24. The apparatus 10 may be powered by connecting the switching device 22 of the apparatus to the vehicle 100 power system. Alternatively, a lithium ion battery (not shown) or the like could be integrated into the control unit 22. Each of the units 12, 14, 16 may have a molded plastic body formed using a variety of commercial known methods. However, it will also be appreciated that the units 12, 14, 16 may be constructed from a series of welded pipes outfitted with a flowmeter and the requisite valve assemblies.

Figure 5:
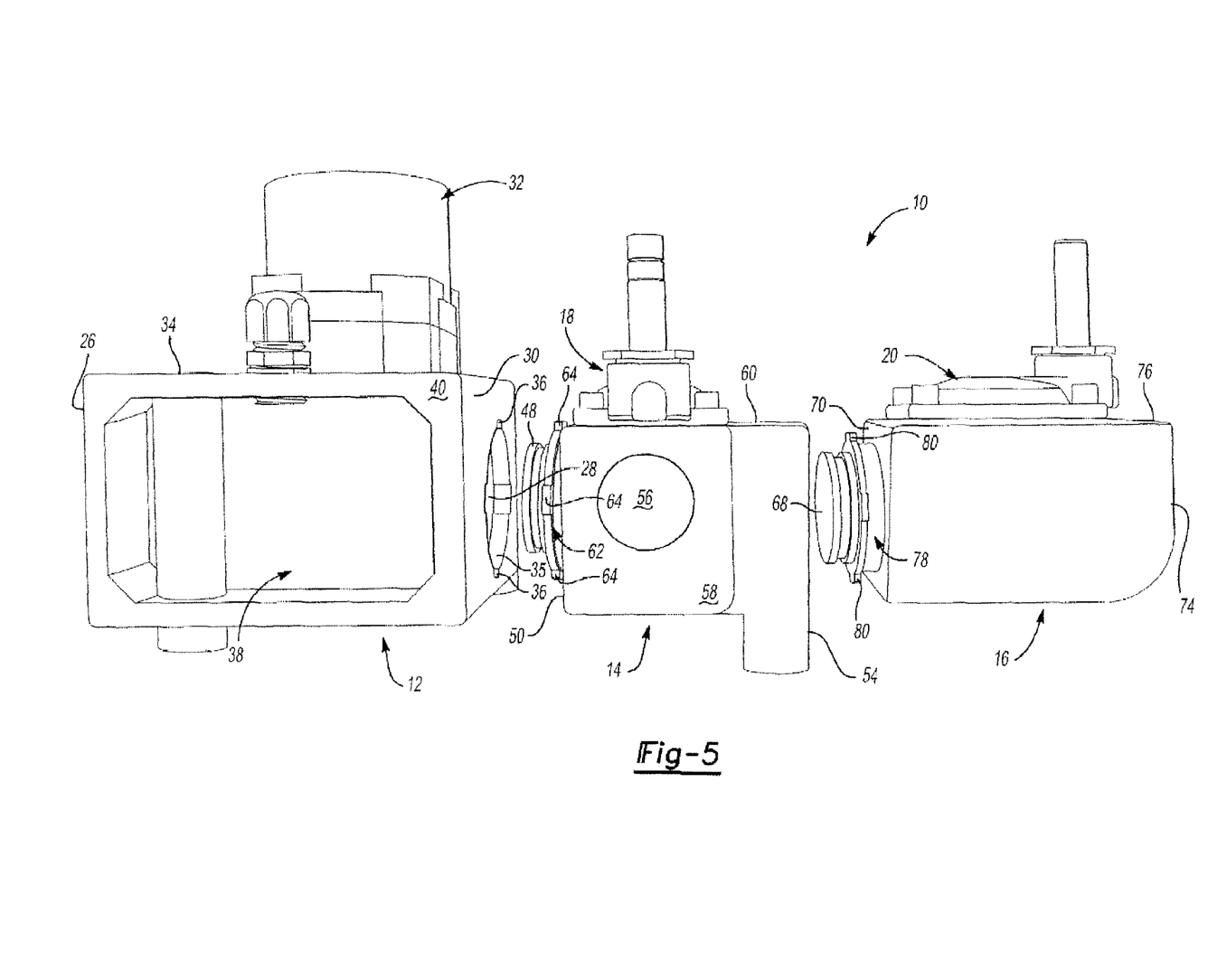
FIG. 5 is a perspective, partially exploded side view of the embodiment of a water control apparatus of FIG. 2.
Figure 6:
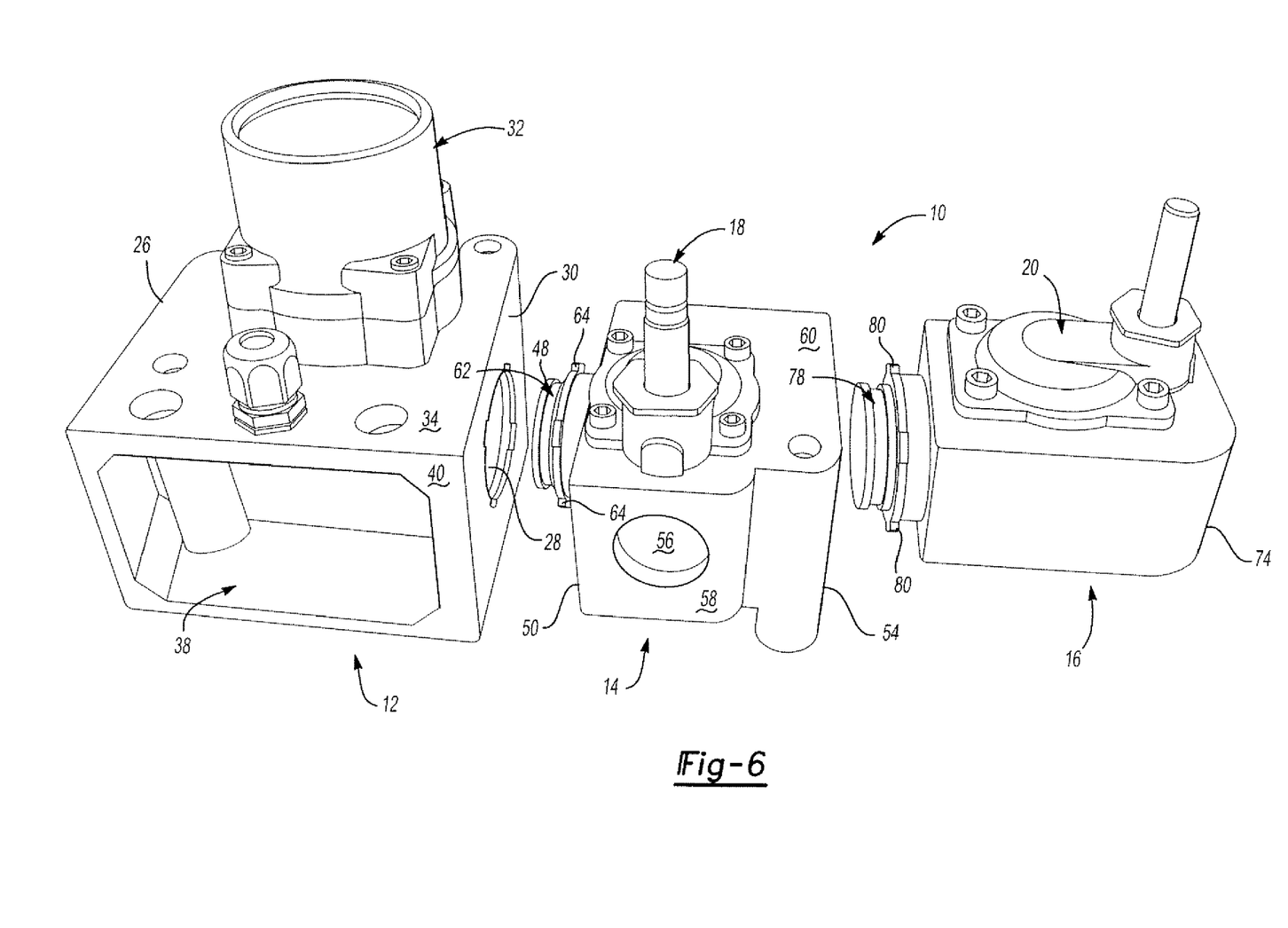
FIG. 6 is a perspective, partially exploded top and side view of the embodiment of a water control apparatus of FIG. 2.

Referring now to FIGS. 2 through 7, the flowmeter unit 12 of the water control apparatus 10 may include a fluid conduit (not shown) that extends through the unit 12 and defines a water intake opening (not shown) on one side 26 of the unit 12 and a water outflow opening 28 on an opposite side 30 of the unit 12. A flowmeter 32 that communicates with the fluid conduit and is capable of measuring low psi flow rates may be mounted on a face 34 of the unit 12. The flowmeter 32 may, for example, be a COOLPOINT® vortex shedding type meter manufactured by Universal Flow Monitors of Hazel Park, Mich. The intake opening (not shown) of the unit 12 may be threaded, or include other manner of connector necessary to secure the unit 12 to a water conduit or hose 106. However, as best shown in FIGS. 5 and 6, the water outflow opening 28 may include a female connector 35 having series of grooves 36 that, as will be discussed below, permit the normally open valve unit 14, or the normally closed valve unit 16 to be removably secured to the flowmeter unit 12.

Referring now to FIGS. 2 through 6, a recess 38 may be defined in another lace 40 of the flowmeter unit 12 into which may be mounted the control unit 22. The control unit 22 may be electrically connected to, and include hardware and/or software that permit tile control and monitoring of the flowmeter 32 and the valves 18, 20. Further, the control unit 22 may be electrically connected to, and triggered by, the switching device 24.

Therefore, as mentioned above, when activated via the switching device 24 the control unit 22 may operate to cause the valve 18 of the normally open valve 16 to close, and the valve 20 of the normally closed valve unit 16 to open. Additionally, or alternatively, the control unit 22 may operate to cause the valve 20 of the normally closed valve unit 16 to automatically open or close to allow (or prevent) an amount of water to flow into the concrete mixing drum. Accordingly, it will be appreciated that the control unit 22 may be programmed to maintain the concrete in the drum within predetermined water—cement ratio over a predetermined time. The control unit 22 may also include a global positioning system (GPS) receiver 27 and a radio transmitter 29 for transmitting data (e.g., flow meter information, valve open/close status) to a remote station.

Figure 1:
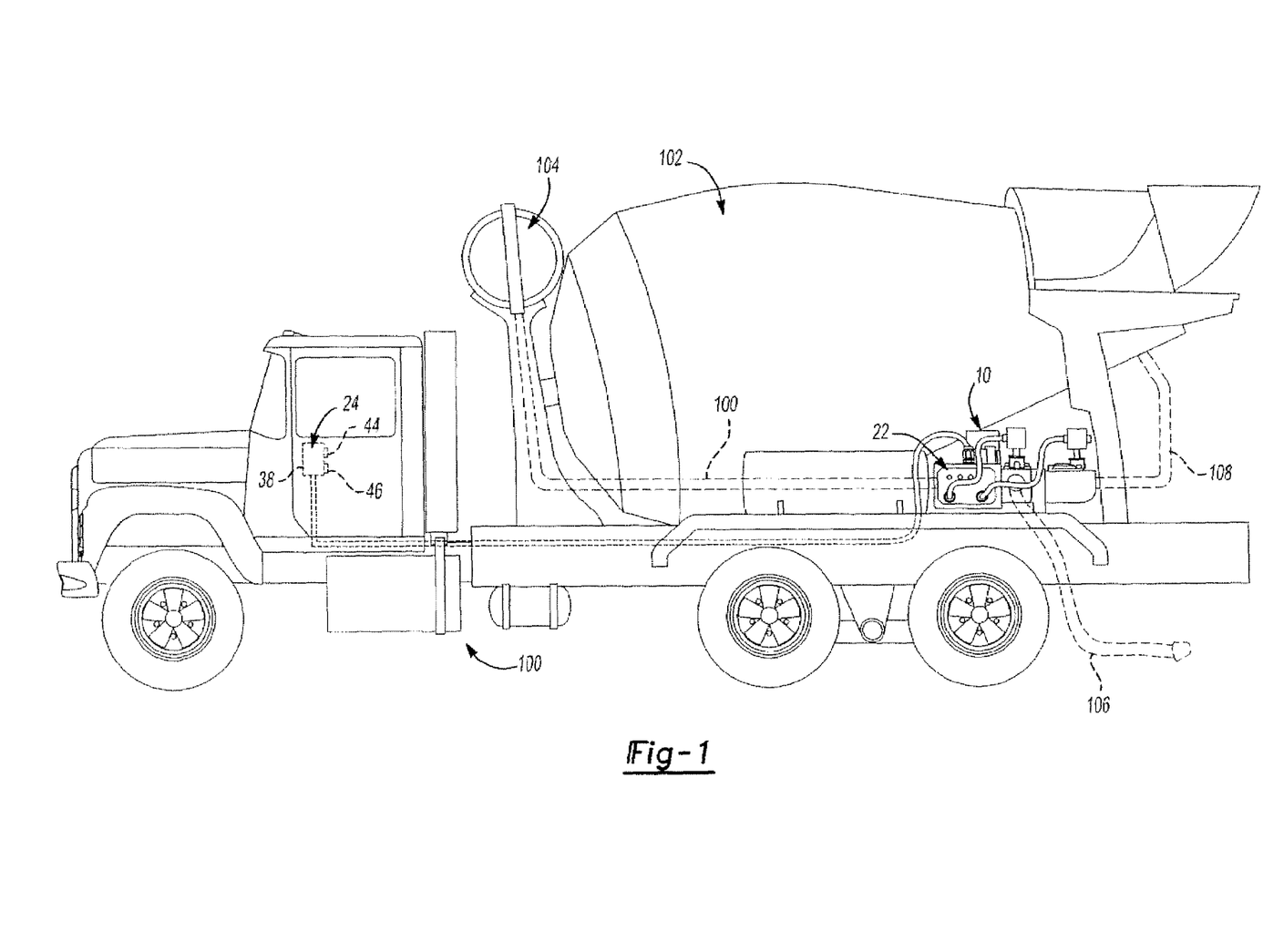
FIG. 1 is a planar environment side view showing an embodiment of a water control apparatus mounted on a mix truck, the apparatus being depicted as larger than normal for purposes of clarity.
Figure 2:
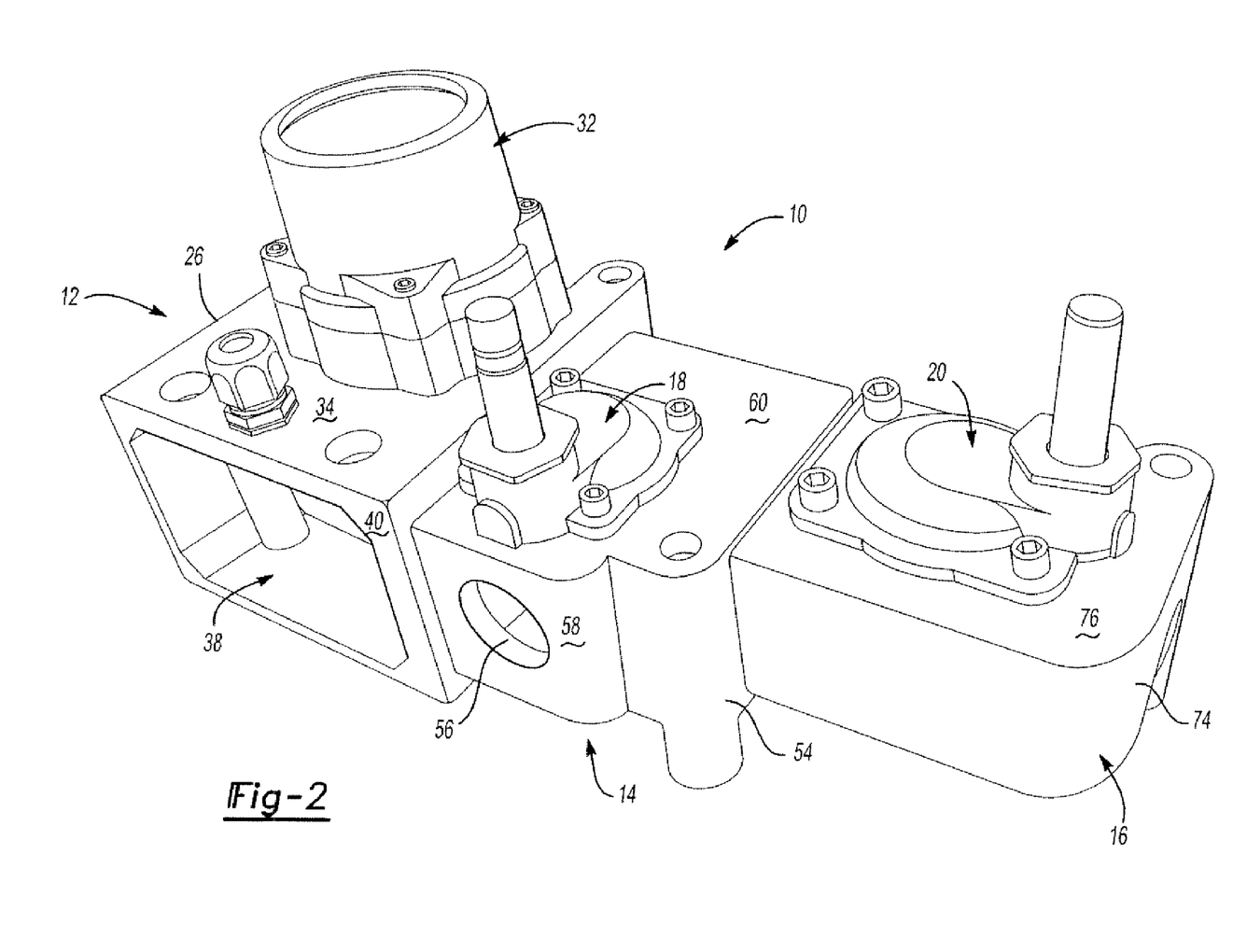
FIG. 2 is a perspective side view of a an embodiment of a water control apparatus.
Figure 3:
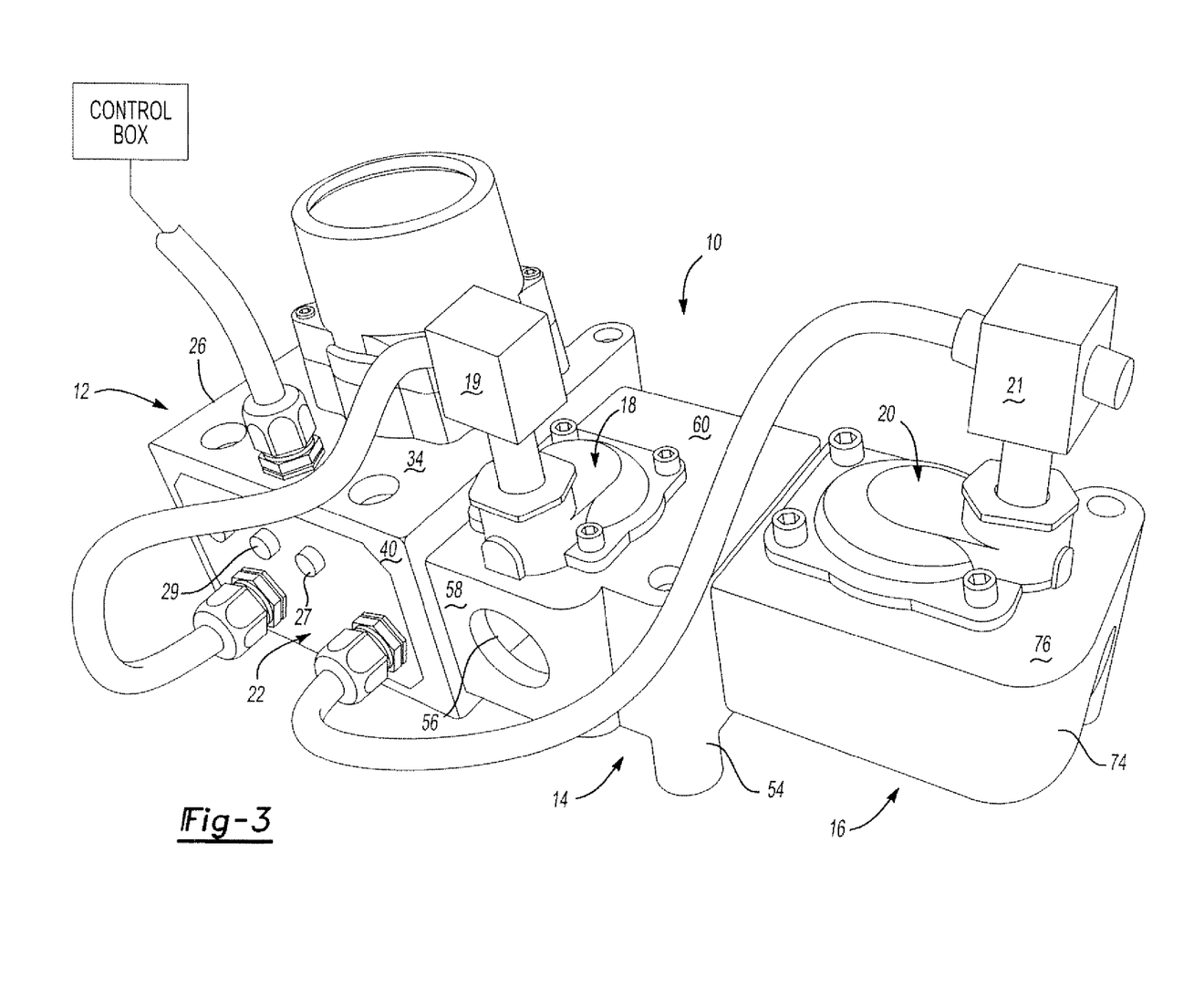
FIG. 3 is a perspective side view of the embodiment of a water control apparatus of FIG. 2 showing solenoids (or the like) mounted on the apparatus valves and a control unit.
Figure 4:
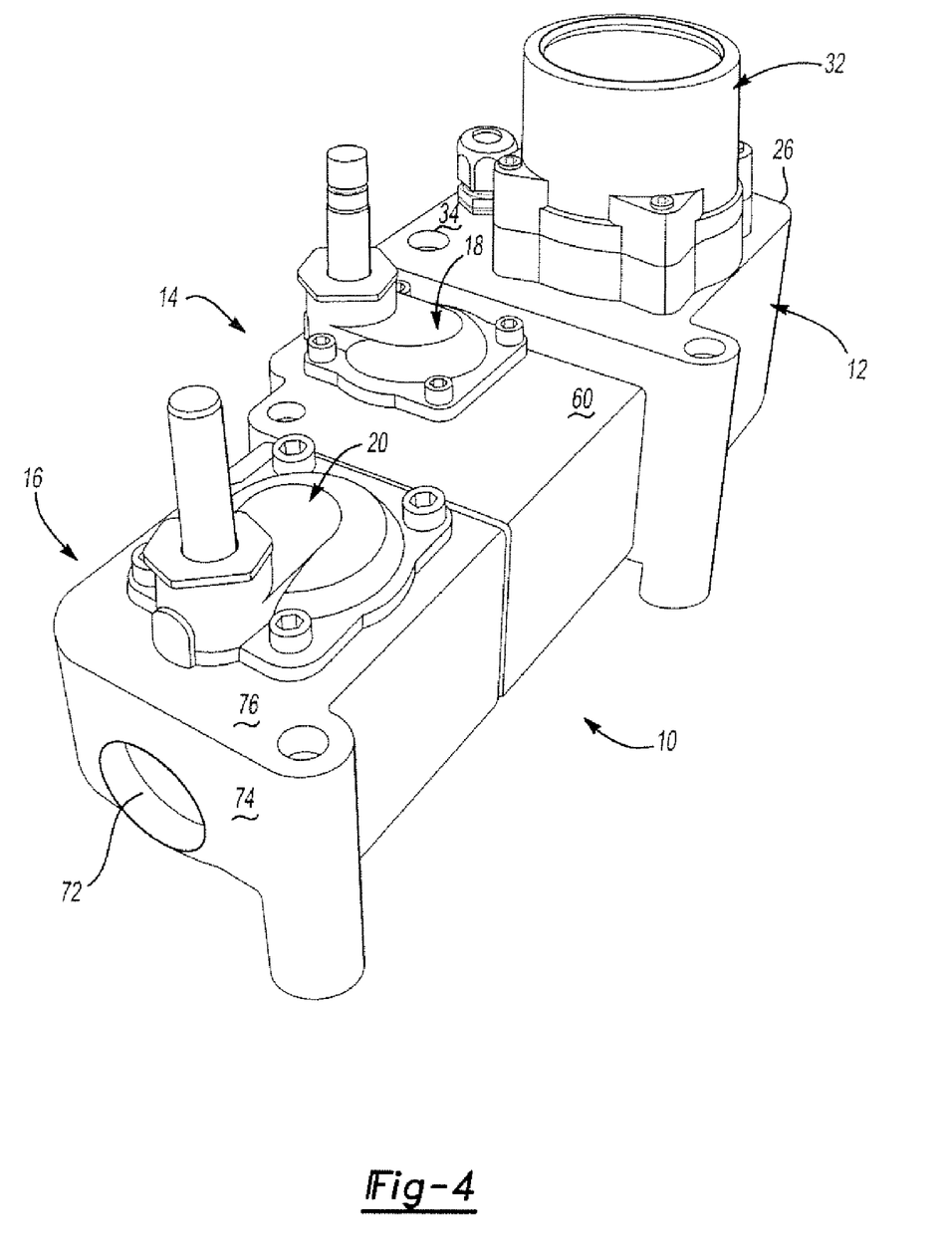
FIG. 4 is a perspective end view of the embodiment of a water control apparatus of FIG. 2.

Referring now to FIGS. 1 and 3, the switching device 24 may include a housing 38 having a toggle switch 44, a display 46 and known electronics (not shown). As shown, the switching device 24 may be positioned within the cabin of a mixer truck 100. However, it will also be appreciated that one or more switching devices 24 may be positioned in a variety of locations on the truck 100, or integrated into the control unit 22.

Referring now to FIGS. 1 and 3, as discussed above, activation of the toggle switch 44 may operate to transmit a command to the control unit 22. The toggle switch 44 may be biased into an of position such that the valve 18 of the normally open valve unit 14 and the valve 20 of the normally closed valve unit 16 remain, respectively, in an open or closed orientation. The display 46 may function to indicate the volume of fluid/water flowing through the flowmeter unit 12 as measured by the flowmeter 32, and monitored by the control unit 22.

Referring now to FIGS. 2 through 6, the normally open valve unit 14 may include a three-way fluid (or branching) conduit (not shown) that may extend through the unit 14. Specifically, the conduit may define a water intake opening 48 on one side 50 of the unit 14, a first water outflow opening on the opposite side 54 of the unit 14, and a second water outflow opening 56 in a face 58 of the unit 14. The power-actuated valve 16 may communicate with the three-way fluid conduit and may be mounted on a face 60 of the unit 14.

As best shown in FIGS. 5 and 6, the water intake opening 48 may include a male connector 62 having a plurality of tongues 64. As such, it will he appreciated that the male connector 62 of the valve unit 14 may be removably fitted to the female connector 35 of the flowmeter unit 12. The first water outflow opening of the normally open valve unit 14 may also define a female connector similar to the female connector 35 of the flowmeter unit 12.

Still referring to FIGS. 5 and 6, the second water outflow opening 56 may be closed off by a removable knockout portion (not shown). Alternatively, the opening 56 may be threaded or include a fitting or connector such that a hose or the like may be connected to the valve unit 14 at the opening 56.

Referring now to FIGS. 2 through 7, the normally closed open valve unit 16 may also include a conduit (not shown) that may extend through the unit 16. Specifically, the conduit may define a water intake opening 68 on one side 70 of the unit 16 and a water outflow opening 72 on an opposite side 74 of the unit 16. The power actuated valve 18 may be mounted on a face 76 of the unit 14 and communicate with the conduit.

Figure 7:
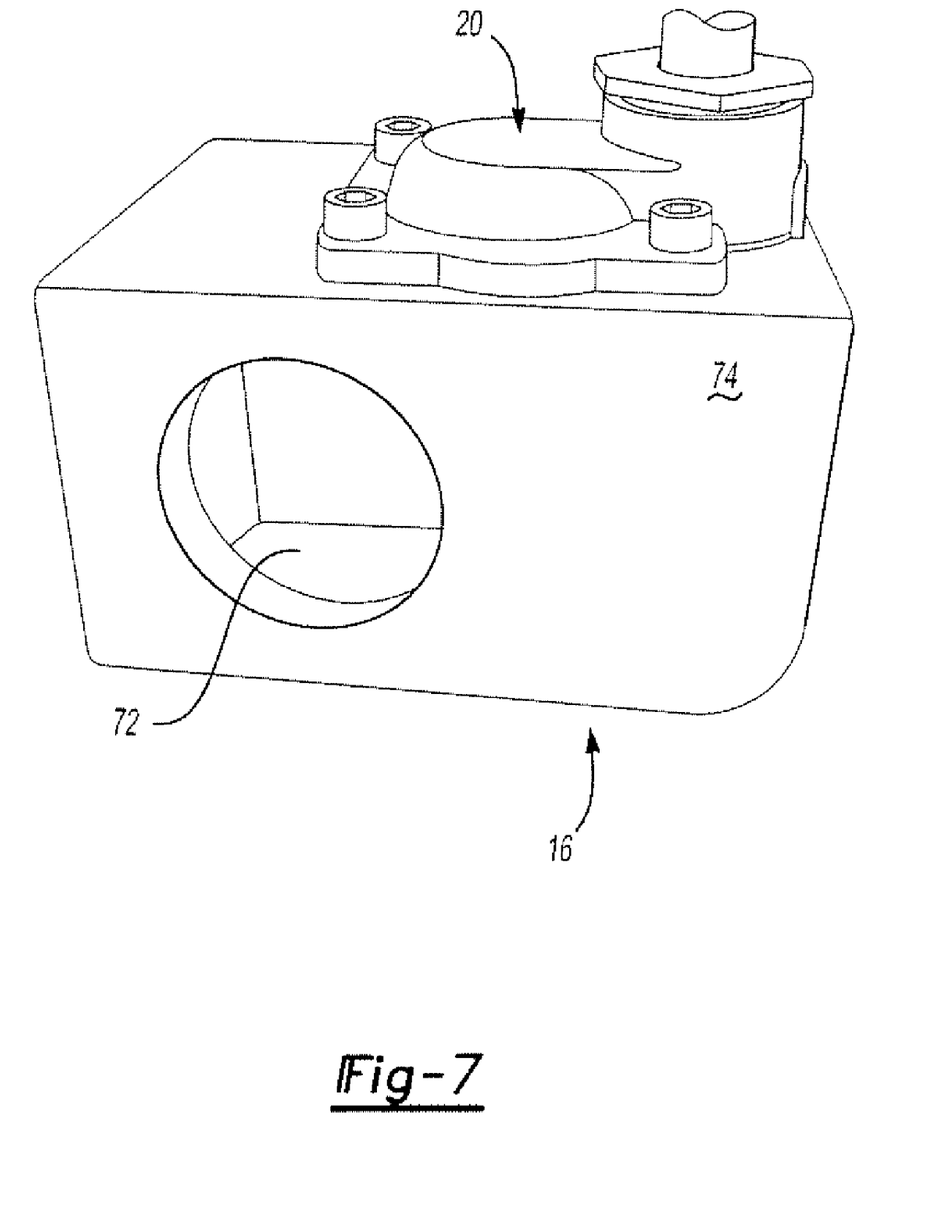
FIG. 7 is a perspective side view of a normally closed valve unit.

As best shown in FIGS. 5 through 7, the water intake opening 68 of the valve unit 16 may include a male connector 78 having a plurality of tongues 80. As such, it will be appreciated that the male connector 78 of the valve unit 16 may be removably titled to the female connector (not shown) of the normally open valve unit 14. The opening 72 of the valve unit 16 may be threaded or include a fitting or connector such that a hose or the like may be connected to the valve unit 16 at the opening 72. For example, as mentioned above a conduit or hose 108 extending from the apparatus 10 to the mixer drum 102 of the mixer truck 100 may be attached to the apparatus 10 at the opening 72.

Referring now to FIGS. 1 through 7, in operation, a user should first be assured that the flowmeter unit 12 of the apparatus 10 is connected to a source of water 102 at the opening water intake opening (not shown) the side 26 of the unit 12. The user should also connect a conduit to the opening 72 of the normally closed valve unit 16. Then, once connected, a user may trigger the toggle switch 44 of the switching device 24. Upon activation of the switch 44, the control unit 22 may command the valve 16 of the normally open valve unit 14 (if present) to close off flow to the second water out flow opening 56 and command the valve 18 of the normally closed valve unit to open—causing water to flow through the water outflow opening 72. As discussed above, the volume of water flowing through the apparatus may be measured by the flowmeter 32, monitored by the control unit 22, and indicated on the display 46 of the switching device 26.

In additional, the radio transmitter 29 of the control 22 may function to transmit a signal to a remote location indicating that the valve 20 of the normally closed valve unit 16 has been opened. More specifically, when used in connection with a commercial mixing vehicle, a signal may be transmitted to indicate that an operator had commenced filling the mixing drum 102 with water. Further, the control unit 22 may transmit a second signal upon detection of fluid/water flowing through the flowmeter 32 when the normally closed valve 20 is in a closed position. Specifically, such a state would indicate that an operator of the mixing vehicle had completed a job and was now using water to clean off his or her vehicle using the nozzle 106.

Having thus described my invention, various additional improvement and embodiments will become know to those of skill in the art that to not depart from the scope of the appended claims

I claim:

1. A water control apparatus for use with a concrete mixing assembly, comprising:
   a flowmeter unit;
   a normally closed valve unit in fluid communication with the flowmeter unit, the normally closed valve unit including a normally closed power actuated valve;
   a normally open valve unit in fluid communication with the flowmeter, the normally open valve unit including a normally open power actuated valve;
   a control unit in electrical communication with and operating to monitor the flowmeter, and open and close the normally closed and normally open power actuated valves;
   a switching device in electrical communication with the control unit, activation of the switch operating to cause the normally closed valve to open and the normally open valve to close; and
   a concrete mixing drum in fluid communication with the normally closed valve unit.

2. The water control apparatus of claim 1, wherein the normally open power actuated valve and the normally closed open power actuated valve are each a solenoid controlled valve.

3. The water control apparatus of claim 1, wherein the mixing drum is positioned on a mixer truck.

4. The water control apparatus of claim 3, wherein the mixer truck includes a cabin and the switching device is mounted in the cabin.

5. The water control apparatus of claim 1, wherein the control unit further comprises a global positioning system receiver.

6. The water control apparatus of claim 1, wherein the control unit further comprises a slump additive calculator operating to cause the control unit to automatically open, close or refrain from opening, the normally closed power actuated valve so that a mix in the concrete mixing drum is maintained at a predetermined water-cement ratio.

7. The water control apparatus of claim 1, wherein the control unit further comprises a radio transmitter operable to transmit a signal to a remote station upon opening of the normally closed valve.

8. A water control apparatus in combination with a mixing vehicle, the combination comprising:
   a mixing vehicle having an onboard water source and a rotating mixing drum; and
   a water control apparatus mounted on the mixing vehicle having;
   a flowmeter unit in fluid communication with the water source of the mixer vehicle;
   a normally open valve unit removably connected to and being in fluid communication with the flowmeter unit and having a normally open power actuated valve;
   a normally closed valve unit removably connected to and being in fluid communication with the normally open valve unit, having a normally closed power actuated valve and being in fluid communication with the mixing drum;
   a control unit in electrical communication with and operating to monitor the flowmeter unit, and open and close the normally closed and normally open power actuated valves;

a switching device in electrical communication with the control unit, activation of the switching device operating to cause the nonnull closed power actuated valve to open and the normally open power actuated valve to close to cause water to flow from the water source, through the water control apparatus and into the mixing drum.

9. The water control apparatus of claim 8, wherein the normally open power actuated valve and the normally closed power actuated valve are each a solenoid controlled valve.

10. The water control apparatus of claim 8, wherein the mixing vehicle includes a cabin and the switching device is mounted in the cabin.

11. The water control apparatus of claim 10, wherein the switching device comprises a toggle switch and a display, the display operating to indicate the volume of water flowing through the flowmeter.

12. The water control apparatus of claim 8, wherein the control unit further comprises a global positioning system receiver.

13. The water control apparatus of claim 8, wherein the control unit further comprises a slump additive calculator operating to cause the control unit to automatically open, close or refrain from opening, the normally closed power actuated valve so that a mix in the concrete mixing drum is maintained at a predetermined water-cement ratio.

14. The water control apparatus of claim 8, wherein the control unit further comprises a radio transmitter operable to transmit a signal to a remote station upon opening of the normally closed valve.

* * * * *